(12) United States Patent
Runion et al.

(10) Patent No.: US 6,374,774 B1
(45) Date of Patent: Apr. 23, 2002

(54) NEST PAD APPARATUS FOR POULTRY AND ANIMALS

(76) Inventors: Derwood L. Runion, 19595 Hepner La., Timberville, VA (US) 22853; Randall D. Wischmann, 25446 Csah #4, Dassel, MN (US) 55325

(*) Notice: Subject to any disclaimer, the term of this patent is extended or adjusted under 35 U.S.C. 154(b) by 0 days.

(21) Appl. No.: 09/234,273

(22) Filed: Jan. 19, 1999

(51) Int. Cl.[7] .................. A01K 31/14; A01K 31/16
(52) U.S. Cl. ................. 119/329; 119/335; 119/347
(58) Field of Search ................. 119/28.5, 329, 119/335, 342, 343, 346, 347, 526, 525; 52/660; 5/420; 15/238, 215

(56) References Cited

U.S. PATENT DOCUMENTS

| | | | | |
|---|---|---|---|---|
| 554,129 A | * | 2/1896 | Lennon | 119/525 |
| 1,042,977 A | * | 10/1912 | Schneider | 15/238 |
| 1,402,790 A | * | 1/1922 | Olson | 119/335 |
| 1,926,133 A | * | 9/1933 | Anderson | 119/335 |
| 2,667,654 A | * | 2/1954 | Peterson | 15/238 |
| 3,011,477 A | * | 12/1961 | Bressler et al. | 119/347 |
| 3,046,940 A | * | 7/1962 | Kurtz | 119/335 |
| 3,242,904 A | * | 3/1966 | Rannou | 119/347 |
| 3,699,926 A | * | 10/1972 | Stockl | 119/526 |
| 3,760,769 A | * | 9/1973 | Erfeling | 119/347 |
| 4,524,723 A | * | 6/1985 | Davis | 119/347 |
| 5,067,196 A | * | 11/1991 | Chen | 15/238 |
| 5,724,916 A | * | 3/1998 | Brodie et al. | 119/525 |

* cited by examiner

*Primary Examiner*—Peter M. Poon
*Assistant Examiner*—Elizabeth Shaw
(74) *Attorney, Agent, or Firm*—Ryan M. Fountain

(57) ABSTRACT

A nest pad for poultry and animals is provided having a plurality of inclined projections extending from its lower surface to register with openings in the support surface of the nest enclosure and removably engage a portion of the support surface via a clamping fit. The inclined projections are arranged in at least two sets, and the direction of inclination of the projections of each such set is opposing and outwardly directed.

10 Claims, 3 Drawing Sheets

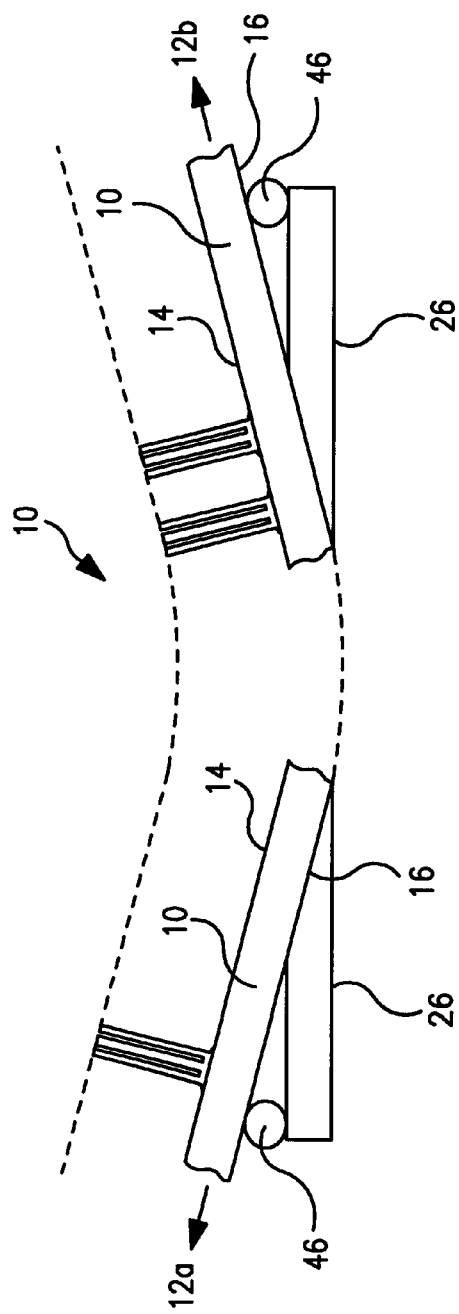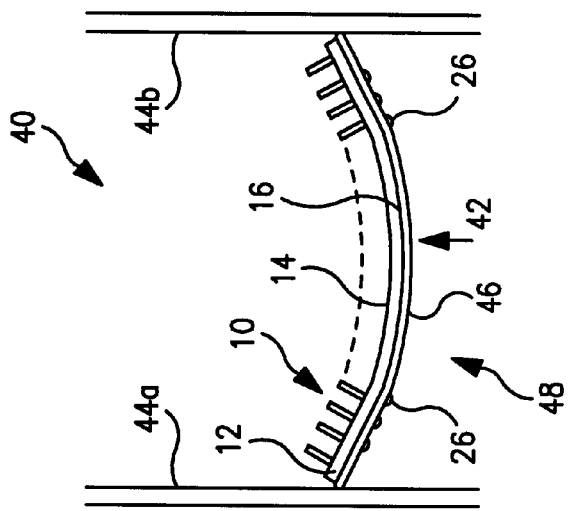

NEST PAD APPARATUS FOR POULTRY AND ANIMALS

BACKGROUND AND SUMMARY OF THE INVENTION

The present invention relates to animal and poultry husbandry apparatus and systems, and, more particularly, poultry nesting systems having removable nest pads.

A wide variety of apparatus have previously been used for raising poultry and other animals. Using the poultry husbandry technology as the exemplary format in this discussion, it has been suggested to raise egg laying hens, breeder birds and other birds within poultry houses or barns by means of numerous rows of cages or partially enclosed nests for individual birds. Previously, wood shavings, straw and other particulate matter have been placed in the bottom of these nests to simulate the grass of a natural nest and offer some degree of protection for the bird and eggs against abrasion and damage. However, such materials have not been sufficiently sanitary and have required frequent replacement. To minimize the time and effort in replacement and to maintain more sanitary conditions for the poultry and the eggs, artificial nest pads have been used in place of particulate matter.

Various different types of artificial nest pads have been used. In general, these pads were formed from deformable or resilient plastic material and had a planar configuration with a plurality of closely spaced projections on the upper surface of the nest pad base, the surface the bird would be in contact with while roosting in the nest. These nest pads were dimensioned so as to closely fit within the nest enclosure and were also often flexible so as to conform to the configuration of the nest floor. In some pads the projections were blunt or round ended soft, rubber cones. In other pads the projections were irregularly oriented, flexible tabs, such as is found in Astro-turf®. In yet other pads the projections were a regular array of flexible tabs arranged in a matrix of tufts. Many pad designs also included flow-through vents, perforations, spacings or holes between some or all of the projections and/or the nest pad base to allow some or all of the debris, manure or moisture to fall through the pad and out of the nest toward an open area below it, as well as to permit air circulation into the nest. U.S. Pat. No. 5,159,896 shows one example of prior nest pads.

The nest pads were typically mounted within the nest enclosure on an opened surface support structure, such as a perforated web or wire grid, grill or mesh, forming the nest floor. The openings in the support structure provided greater ventilation, ease of cleaning, and reduced fabrication costs. The support structure was not always flat or horizontally disposed within the nest enclosure. Rather, the support structure typically curved from side to side within the nest enclosure and/or inclined from front to back or from side to side. Such non-horizontal orientations were used, for example, to facilitate the automatic removal of eggs from the nest by encouraging them to gently roll toward an exit from the nest and toward a removal conveyor, often disposed adjacent the nest enclosure. The nest pads have previously been mounted on the support structure so as to closely conform to the orientation of the support structure.

However, prior nest pads were not usually permanently mounted to the support structure since, over time, even with flow-through perforations the nest pads became dirty and required cleaning. In general, it has been far easier to reliably clean the nest enclosure and nest pads if the nest pads are removable from the nest enclosure. U.S. Pat. 5,551,460 describes cleaning processes for such nest pads, once removed from the nest enclosure. To some extent, the interior configuration of the nest enclosure does restrict movement of the nest pads within the enclosure and out of it. Unfortunately, the constant movement of the birds into, out of and within the nest enclosure tends to displace the nest pad from its preferred orientation. Over time, the nest pad can even be dragged out of the nest enclosure and onto the poultry house floor or slide into the nest exit intended for eggs, thus clogging the egg removal conveyor.

It has been suggested to form a plurality of vertical, cylindrical projections from the lower surface of the nest pad to restrict migration of the nest pad from the support structure. In order to obtain the desired degree of retention security, such prior projections have had to be formed with relatively large dimensions, projecting further vertically and being thicker in cross-section. Doing so, however, made the packaging and shipping of the nest pads more costly since fewer nest pads could be stacked within a given container without having the downward projections of one nest pad crush or be crushed by the upward projections of the adjacent nest pad. Moreover, the larger projection dimensions increased the likelihood that one or more projections would not fully register with a support surface opening and pass through it, thus preventing the nest pad from properly seating within the nest enclosure. Further, with certain types of nest pads creating a select number of such projections could require prohibitively expensive tooling since the projections extending below the nest pad toward the support structure would typically be diverse in nature, typically more rigid, from the upward projections supporting the bird. Finally, while such vertical projections could, when properly seated, restrict sliding of the nest pad relative to the support surface, they were not positively locked to the support surface, at best providing an slidable, interference fit. Thus, they were susceptible to upward force dragging, for example, if a bird's claw snagged and lifted the nest pad vertically, and had difficulty in maintaining full seating on curved support surfaces.

Accordingly, it is an object of this invention to provide an improved nest pad for poultry and animals and an improved arrangement for using such nest pads. Further objects include the provision of a nest pad that is:

a. positively locatable with respect to its support structure, b. easy to install and remove from the nest enclosure, c. economical to manufacture and market, d. closely conformable to the support structure configuration, e. biased against unintended unseating from the support structure, f. adaptable to a variety of different support structures and configurations, g. of compact dimension with minimal extension below the pad base, and h. stackable for shipping, storage, packaging or handling without causing significant deformation of the bird supporting projections on the top surface of each nest pad.

These and other objects of the present invention are obtained through the provision of a nest pad having a plurality of inclined projections extending from its lower surface to register with openings in the support surface and removably engage a portion of the support surface via clamping fit. The inclined projections are arranged in at least two sets, and the direction of inclination of the projections of each such set is opposing and outwardly directed.

BRIEF DESCRIPTION OF THE DRAWINGS

FIG. 3 shows a cut-away, cross-sectional view of the nest pad of FIG. 1 within a representative nest enclosure.

FIG. 4 shows an enlarged cross-sectional view of a portion of the nest pad of FIG. 1 illustrating the retention of the nest pad to the support structure.

The drawings are not to scale with respect to each other and repetitious detail, such as vent and tuft patterns, has been shown in dashed lines to preserve clarity of view.

DESCRIPTION OF PREFERRED EMBODIMENTS

Figure 1:
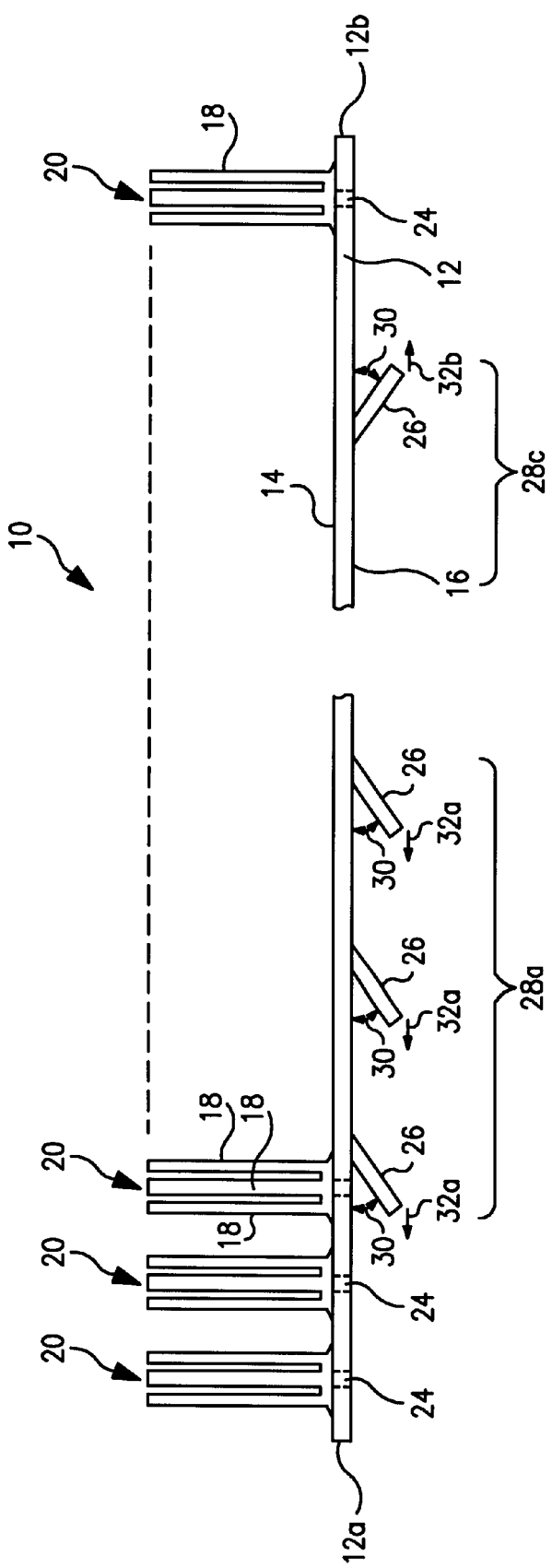
FIG. 1 shows a side view of a nest pad incorporating the present invention.

FIG. 1, which illustrates a preferred embodiment of the present invention, shows a nest pad 10 particularly adapted for use with poultry. Nest pad 10 is preferably formed by injection molding of flexible plastic material and includes a base 12 having an upper surface 14 and a lower surface 16. Prior to insertion into the nest enclosure, base 12 is, for example, a generally planar, rectangular web having a left side 12a, a right side 12b, a front 12c and a back 12d. Flexible upper projections or fingers 8 are formed on upper surface 14 and arranged in a series of tufts 20. Each of these tufts 20 preferably includes eight upper projections 18 arranged in a generally circular configuration and extending vertically upwards from base 12. As with prior nest pads, projections 18 can be sufficiently flexible to be crushed downwardly to a degree by bird weight to form a comfortable roosting surface.

Figure 2:
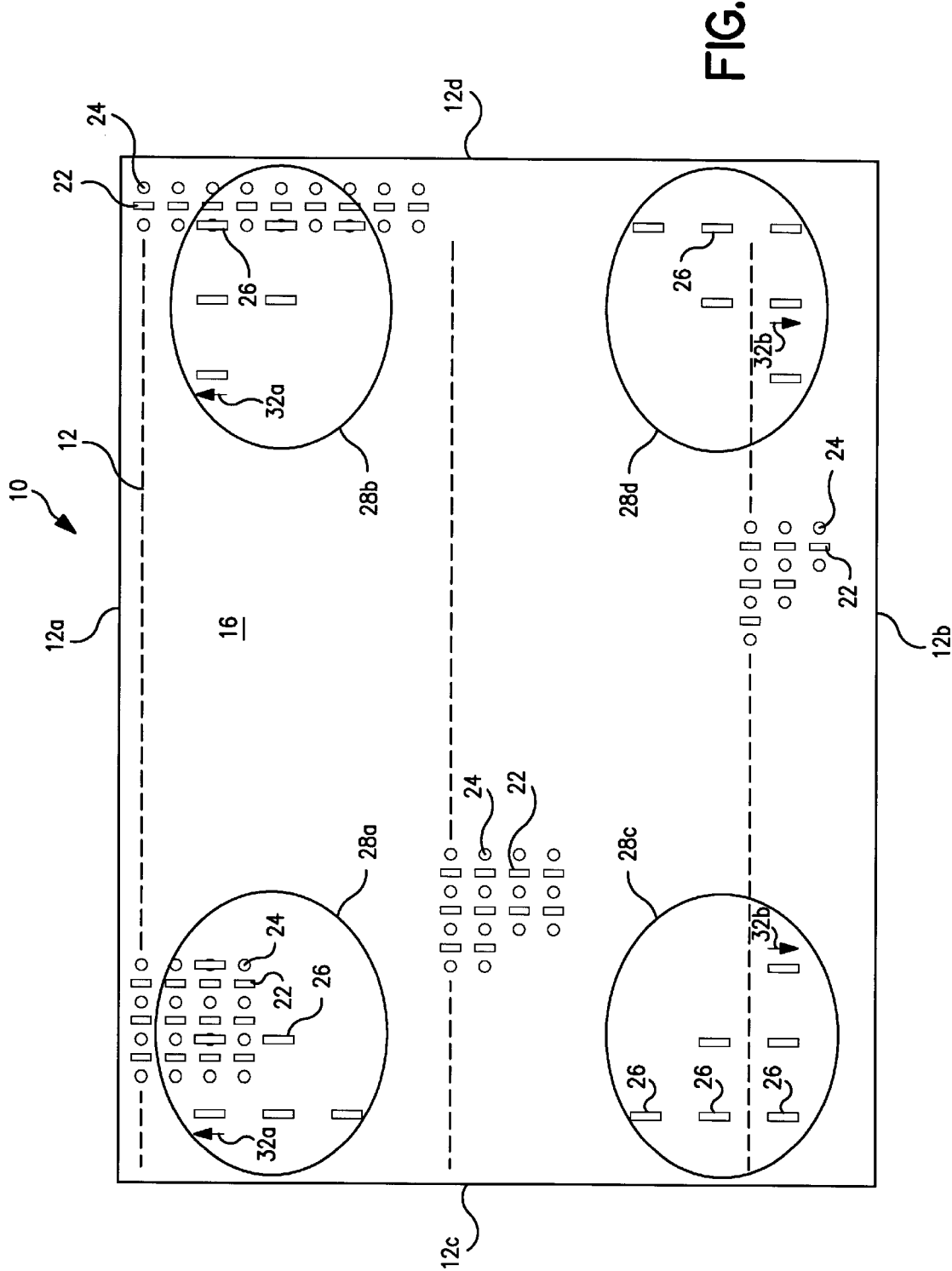
FIG. 2 shows a bottom plan view of the nest pad of FIG. 1.

Vents or perforations 22 are provided in base 12 between tufts 20, and vents or perforations 24 are provided in base 12 within tufts 20 at the central area of the circle formed by projections 18. As shown in FIG. 2, in the illustrated embodiment vents 22 are generally rectangular and vents 24 are generally circular. As with vents in prior nest pads, vents 22 and 24 serve to permit air circulation and pass-through of debris and moisture from the nest enclosure to areas below the nest enclosure.

Lower surface 16 is formed with a plurality of inclined projections 26 which extend generally downwardly from lower surface 16 when the nest pad is viewed from the orientation of FIG. 1. Each such inclined projection is, for example, generally cylindrical or slightly conical in shape and integrally molded with base 12. For ease of molding and/or greater strength, the portion of the inclined projection adjacent lower surface 16 can be slightly thicker in its cross-sectional dimension than the portion of the inclined projection extending downwardly further from lower surface 16. Preferably, inclined projections 26 are more rigid than projections 18.

In preferred embodiments, inclined projections 26 are arranged into a plurality of sets 28. Each set is, for example, spaced apart from the other set and associated with a particular side and/or corner of nest pad 10. The inclined projections of a given set are formed with an angle 30 of inclination or direction 32 of inclination which is directed toward an associated side of base 12 of the nest pad. The angle 30 or direction 32 of inclination of a given set of inclined projections 26 is preferably not the same and diverse from the angle or direction of inclination of a different set of inclined projections within the same nest pad.

For example, FIG. 2 shows sets 28a, 28b, 28c and 28d of inclined projections 26. Each set includes six inclined projections 26 spaced apart from each other and arranged in a generally triangular formation associated with the nest pad corners. Sets 28a and 28b are associated with left side 12a in that direction of inclination 32a of inclined projections 26 in each of those sets is toward that side. Similarly, sets 28c and 28d are associated with right side 12b in that direction of inclination 32b of inclined projections 26 in each of those sets is directed toward that side. Direction of inclination 32a is shown as opposite direction of inclination 32b.

In use, nest pad 10 is inserted within nest pad enclosure 40 on top of support structure 42. Enclosure 40 preferably has a front wall, with an opening therein through which birds enter and leave the nest, and a back wall, with an opening for eggs to leave the nest, connected together by side walls 44a and 44b. In some embodiments the opening for eggs to leave the nest may be in the other walls, according to the inclination of the support surface and the location of the egg removal conveyor (not shown, but conventional in nature).

Support structure 42, is for example formed from a grid of cross-crossing wires 46 extending in a curve 48 between the side walls. Alternatively, the grid may extend as a substantially flat incline. Nest pad 10 is mounted to support surface 42 by placing the nest pad thereon, flexing base 12 such that inclined projections 26 pass through the openings in the support surface formed between wires 46 and then relaxing the flexing force on base 12 to allow inclined projections 26 to engage portions of wires 46 and retain those portions in a clamping-like fit between the inclined projection and lower surface 16. Forming inclined projections 26 at locations on lower surface 16 where openings in support structure 42 are expected will facilitate this engagement and retention to achieve positive location of the nest pad to the support structure. To the extent there is a degree variance between the actual and expected positions of those openings in the support structure, the inclined nature of projections 26 permits accommodation.

Where support structure 42 is curved, inclined projections 26 can thereby retain nest pad 10 in a similarly curved orientation against a predetermined level of removal force, especially since where the flexibility of nest pad 10 is such that it is biased toward a flat orientation, a constant force is exerted by inclined projections 26 toward the portions of wires 46 retained by those projections. In preferred embodiments, this force is directed toward the sides of the nest pad by the orientation of inclined projections 26. Viewed alternatively, the nest pad exerts a biasing force the urges a portion of the support structure into the clamping engagement with inclined projections 26 and lower surface 16. When it is desired to remove the nest pads for cleaning, a greater removal force can be exerted or base 12 can again be flexed to withdraw inclined projections 26 from engagement with wires 46. Similarly, positive location of the nest pad to an inclined support structure is providable.

At the same time, by forming projections 26 with an incline, rather than a purely vertical extension from lower surface 16, the projections can have sufficient length to securely engage support structure 42 and yet minimally intrude upon projections 18 of adjacent nest pads when nest pads are stacked for shipping or storage. Thus, the risk of undesirably deforming projections 18 prior to or between use is reduced without incurring greater shipping or storage costs. Similarly, since a clamping fit is provided, the cross-sectional dimensions of projections 26 can be reduced from those required to maintain an interference fit. Further, since the incline of projections 26 tolerates a wider variety of support structure configurations and dimensional deviations, nest pad 10 can be more versatile in its applications.

Although certain preferred embodiments of the present invention have been described above in detail, that is only by way of illustration and example. Those of ordinary skill in the art will now appreciate that modifications and adaptations of this invention can be made to many environments of use and that the vertical and horizontal orientations stated herein are frames of reference only and not application specific requirements. Accordingly, the spirit and scope of the present invention are to be limited only by the terms of the claims below.

What is claimed is:

1. A nest pad for poultry or small animals, comprising:
   a flexible pad member having a top surface for being contacted by poultry or small animals and a bottom surface for being in contact with a support member, and
   the bottom surface having inclined projections thereon for resisting removal of the pad member from the support member.

2. The nest pad according to claim 1 wherein the nest pad is formed from flexible material so as to be curved in its orientation of use by poultry or small animals and the projections are integrally formed with the pad material.

3. A nest pad for poultry or small animals, comprising:
   a flexible pad member having a top surface for being contacted by poultry or small animals and a bottom surface for being in contact with a support member,
   the bottom surface having inclined projections thereon for resisting removal of the pad member from the support member, and
   wherein there are at least two spaced-apart, inclined projections on the bottom surface, each having an angle or direction of inclination diverse from the angle or direction of inclination of the other projection.

4. A nest pad for poultry or small animals, comprising:
   a flexible pad member having a top surface for being contacted by poultry or small animals and a bottom surface for being in contact with a support member,
   the bottom surface having inclined projections thereon for resisting removal of the pad member from the support member, and
   wherein there are at least two sets of the inclined projections, each set being spaced apart from the other set, all the projections of a given set having substantially the same direction of inclination, and direction of inclination of the projections of one set being opposed to the direction of inclination of another set.

5. The nest pad according to claim 4 wherein a set of the inclined projections is disposed adjacent each corner of the bottom surface, the direction of inclination of two of the sets is toward a common first side of the pad and the direction of inclination of two other of the sets is toward a common second side of the pad.

6. A nest pad arrangement for poultry or small animals, comprising:
   an enclosure for receiving poultry or small animals in a nesting orientation,
   a support mounted within the enclosure and formed with openings therein,
   a nest pad member mounted on the support, and
   retention means on the nest pad member for engaging the support member through the openings therein and positively locating the nest pad member with respect to the support.

7. The nest pad arrangement according to claim 6 wherein the nest pad member has an upper and a lower surface, the support member is formed from a wire web and the retention means includes a plurality of projections inclined outwardly from the lower surface of the nest pad member and spaced so as to engage portion of the wire web when the nest pad is mounted onto the support.

8. The nest pad arrangement according to claim 6 wherein the support is formed to be generally arctuate from a first side to a second side, forming a downwardly curved support surface within the enclosure, and the nest pad member is curved to substantially conform to the support surface, the nest pad member being formed from flexible material that permits deformation to the curve but exerts a restorative force biased against that deformation.

9. A nest pad arrangement for poultry or small animals, comprising:
   an enclosure for receiving poultry or small animals in a nesting orientation,
   a support mounted within the enclosure and formed with openings therein,
   a nest pad member mounted on the support, and
   retention means on the nest pad member for engaging the support member through the openings therein and positively locating the nest pad member with respect to the support,
   wherein the nest pad member has an upper and a lower surface, the support member is formed from a wire web and the retention means includes a plurality of projections inclined outwardly from the lower surface of the nest pad member and spaced so as to engage portion of the wire web when the nest pad is mounted onto the support, and
   wherein the projections are inclined so as to locate a portion of the wire web between the lower surface and the projections when the nest pad is mounted onto the support.

10. A nest pad arrangement for poultry or small animals, comprising:
    an enclosure for receiving poultry or small animals in a nesting orientation,
    a support mounted within the enclosure and formed with openings therein,
    a nest pad member mounted on the support, and
    retention means on the nest pad member for engaging the support member through the openings therein and positively locating the nest pad member with respect to the support,
    wherein the support is formed to be generally arctuate from a first side to a second side, forming a downwardly curved support surface within the enclosure, and the nest pad member is curved to substantially conform to the support surface, the nest pad member being formed from flexible material that permits deformation to the curve but exerts a restorative force biased against that deformation, and
    wherein the retention means includes a plurality of projections arranged in at least a first and a second set, each set being associated with one of the first and second sides of the support, and each projection is inclined downwardly away from the nest pad member and outwardly toward its associated side of the support such that the restorative force urges a portion of the support between the projections and another surface of the nest pad member.

* * * * *